United States Patent
Helsen et al.

(10) Patent No.: US 7,689,612 B2
(45) Date of Patent: Mar. 30, 2010

(54) HANDLING OF QUERIES OF TRANSIENT AND PERSISTENT DATA

(75) Inventors: Simon P. Helsen, Wiesloch (DE); Stephan J. Lange, St. Leon-Rot (DE)

(73) Assignee: SAP AG, Walldorf (DE)

( * ) Notice: Subject to any disclaimer, the term of this patent is extended or adjusted under 35 U.S.C. 154(b) by 352 days.

(21) Appl. No.: 11/788,582

(22) Filed: Apr. 19, 2007

(65) Prior Publication Data
US 2008/0262999 A1 Oct. 23, 2008

(51) Int. Cl.
*G06F 17/30* (2006.01)
(52) U.S. Cl. .................. 707/706; 707/756; 707/708; 711/129
(58) Field of Classification Search ............. 707/1–3, 707/101–102, 200; 711/129
See application file for complete search history.

(56) References Cited

U.S. PATENT DOCUMENTS

| 6,691,101 | B2* | 2/2004 | MacNicol et al. | 707/2 |
|---|---|---|---|---|
| 6,874,066 | B2* | 3/2005 | Traversat et al. | 711/135 |
| 7,308,474 | B2* | 12/2007 | Chandrasekar et al. | 709/203 |
| 2002/0103815 | A1* | 8/2002 | Duvillier et al. | 707/203 |
| 2002/0111941 | A1* | 8/2002 | Roux et al. | 707/3 |
| 2004/0010663 | A1* | 1/2004 | Prabhu | 711/143 |
| 2006/0069702 | A1* | 3/2006 | Moeller et al. | 707/200 |
| 2006/0206468 | A1* | 9/2006 | Dettinger et al. | 707/3 |
| 2007/0214157 | A1* | 9/2007 | Kegeli | 707/101 |
| 2008/0104102 | A1* | 5/2008 | Zhang | 707/102 |
| 2009/0254601 | A1* | 10/2009 | Moeller et al. | 709/201 |

OTHER PUBLICATIONS

"Meta Object Facility (MOF) Specification", Version 1.4, Apr. 2002, retrieved from the Internet: URL:http://www.omg.org/docs/formal/02-04-03.pdf [retrieved on Jul. 31, 2007]. pp. 1-357.
Ilia Petrov, et al. "iRM: An OMG MOF Based Repository System with Querying Capabilities," ER 2004, LNCS 3288, pp. 850-851.
Thomas Hettel, "Impact Analysis of OCL Expressions," Diplomarbeit, Apr. 2006, pp. 1-120.
Universitat Karlsruhe, "Neuerwerbungen Apr. 2006", Fakultatsbibliothek Informatik Neuerwerbungen, Apr. 2006, pp. 1-16.
OMG, "Meta Object Facility (MOF) Core Specification, Version 2.0," OMG Available Specification [Online], Jan. 2006, pp. 1-88.
Duddy K, et al. "MOF Query / Views / Transformations, Initial Submission," OMG Document, No. AD-2003-02-03, Mar. 3, 2003, pp. 1-66.

(Continued)

*Primary Examiner*—Wilson Lee
*Assistant Examiner*—Hanh B Thai
(74) *Attorney, Agent, or Firm*—Mintz, Levin, Cohn, Ferris, Glovsky & Popeo, P.C.

(57) ABSTRACT

A query of a meta-object facility repository that includes transient data being modified or processed in memory and persisted data can be received. Thereafter, portions of the received query can be executed on partitions associated with the persisted data and other portions of the received query can be executed on partitions of the repository associated with the transient data to generate a combined correct query result set. Related apparatus, systems, methods, and articles are also described.

20 Claims, 7 Drawing Sheets

OTHER PUBLICATIONS

Michael Thonhauser et al, "Model-based Data Processing with Transient Model Extensions," Engineering of Computer-Based Systems, 2007, ECBS '07, 14$^{th}$ Annual IEEE International Conference and Workshops on the, IEEE, PI Mar. 1, 2007, pp. 1-8.

Axel Uhl, "Model=Driven Development at SAP," Model Driven Architecture, SS2006 Course Materials [online], Jul. 12, 2006, <http://download.informatik.uni-freiburg.de/lectures/MDA/2005-2006WS/Slides//VorlesungFreiburg.ppt> Aug. 20, 2008, pp. 1-80.

Uhl A. "Model-Driven Development in SAP," Model-Driven Architecture SS2006 (Lecture presented by Thiemann P.) [online] <http://electures.informatik.uni-freiburg.de/catalog/chapter.do?courseId+mdaSS2006&chapter=10> Aug. 21, 2008, 1 page.

Ilia Petrov et al., "An OMG MOF Based Repository System with Querying Capability—the iRM Project," Proceedings of the Sixth International Conference on Information Integration and Web-Based Applications and Services (ILWAS2004), 2004, pp. 1-10.

Altenhofen et al., "OCL Support in an industrial environment" OCL APPS Workshop Sep. 1, 2006, pp. 1-14.

Kotopoulos et al., "Querying MOF Repositories: The Design and Implementation of the Query Metamodel Language (QML)," Feb. 2, 2007, pp. 1-6.

Hearnden et al., "MQL: A powerful extension to OCL for MOF Queries," Enterprise Distributed Object Computing Conference 2003, Seventh IEEE International, Sep. 16-19, 2003, Piscataway, NJ, USA Sep. 16, 2003, pp. 1-14.

Loecher et al., "A Meta-model Based OCL-Compiler for UML and MOF" Electronic Notes in Theoretical Computer Science, Elsevier, vol. 102, Nov. 2, 2004, pp. 1-20.

* cited by examiner

|   |   | Non-simplified | Simplified |
|---|---|---|---|
| 1 | ⊘  ⊘ | Q1 | Q1 |
| 2 | ⊙—⊙ | Q2 | Q2 |
| 3 | ⊛  ⊛ | Q1, Q2, Q3 | Q1', Q2 |
| 4 | (dom) ⊘—⊛ (sub) | Q1, Q3 | Q1' |
| 5 | (dom) ⊘—⊙ (sub) | Q3 | Q1' |
| 6 | (dom) ⊙—⊛ (sub) | Q2 | Q2 |
| 7 | (sub) ⊘  ⊛ (dom) | Q1, Q2 | Q1, Q2 |
| 8 | (sub) ⊘—⊙ (dom) | Q2 | Q2 |
| 9 | (sub) ⊙—⊛ (dom) | Q2, Q3 | Q1, Q2 |

HANDLING OF QUERIES OF TRANSIENT AND PERSISTENT DATA

TECHNICAL FIELD

The subject matter described herein relates to the handling of queries of both transient and persistent data.

BACKGROUND

The Meta-Object Facility (MOF) Specification (Object Management Group standard) defines an abstract language and a framework for specifying, constructing, and managing technology neutral metamodels. A metamodel can be characterized as an abstract language for some kind of metadata. In addition, the MOF defines a framework for implementing repositories that hold metadata (e.g., models) described by the metamodels. This framework uses standard technology mappings to transform MOF metamodels into metadata APIs. This arrangement gives consistent and interoperable metadata repository APIs for different vendor product and different implementation technologies.

For infrastructures adopting an MOF repository, such as the SAP Modeling Infrastructure (MOIN) in which a declarative query language has been developed (MQL), MOIN is hosted on a database, either centrally (server-based) or locally (client Integrated Development Environment). In such arrangements, current data is maintained in memory, in particular when it is being processed or modified. Data being processed is referred to as "dirty" when it only exists transiently (i.e., until it is saved to a database).

One conventional technique for accessing a MOIN repository is via a standardized JAVA API. With this technique, data must be brought into memory, which unnecessarily consumes memory, especially when large amounts of data must be processed.

SUMMARY

In one aspect, a query of a meta-object facility repository that comprises transient data being modified or processed in memory and persisted data is received. Thereafter, portions of the received query on partitions associated with the persisted data are executed and other portions of the received query are executed on partitions of the repository associated with the transient data to generate a query result set.

In some implementations, it can be determined whether the query is type correct with respect to a corresponding meta-object facility meta-model so that the query can be transformed into a first internal query having an internal query structure. The executing can comprise expanding the first internal query into a second internal query containing leaf queries which can be executed in a single run on all query processors registered with the meta-object facility repository and non-leaf portions which can be interpreted by a query engine. Each leaf query can be assigned with the corresponding registered query processor to generate a third internal query. The third internal query can be optimized to generate a prepared query. Subsequently, it can be checked whether any of the partitions are dirty to generate fourth internal query mixing transient data and persistent data. Leaf queries of the received query can then be executed on the corresponding registered query processors. As a result, the results from the executed leaf queries of the received query with in-memory results can be combined to generate the query result set.

In an interrelated aspect, an apparatus includes a query pre-processor and a query engine. The query pre-processor can receive a query of a meta-object facility repository, the repository comprising transient data being modified or processed in memory and persisted data. The query engine can execute portions of the received query on partitions associated with the persisted data and can execute portions of the received query on partitions of the repository associated with the transient data to generate a query result set.

In another aspect, the subject matter described herein provides scheduling logic (performed, for example, by a scheduler in an MQL execution engine) that can break down a client-formulated query into smaller queries, whose results are recombined in memory. Such a process can occur prior to each query execution while taking into account a current state of the repository. In order to implement such an arrangement a scheduler must identify which repository partitions (i.e., artificial groupings of model data) are being edited (and are thus dirty), which partitions are loaded (in memory, but not changed), and which partitions are persistent only (not loaded in memory). Based on this identification, the query is broken down into smaller queries, that either operate in transient memory (typically on dirty data) or on a persistent database. The results of these queries are then combined (also in memory) in the result set, which may be made available to the user.

In implementations in which there are links (i.e., connections between two model elements that is stored with one or both model elements) in the MOIN repository, if the two model elements are not together in transient memory or not together in persistent memory, the scheduler can spread the bit of the query addressing this link-traversal. A heuristic algorithm as described herein can be utilized to combine link traversal operations while minimizing spreading.

In other variations, queries can be scoped such that parts (or all) of the considered query are reformulated so as to only execute on selected parts of the MOIN repository. Such scoping information can improve the ability of a scheduler to minimize and/or obviate query spreading.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a table illustrating spreading characteristics for different types of linked nodes.

Like reference symbols in the various drawings indicate like elements.

DETAILED DESCRIPTION

Figure 1:
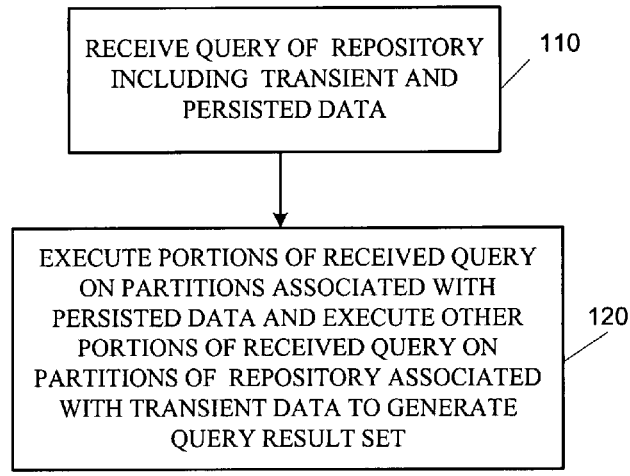
FIG. 1 is a process flow diagram illustrating a method of executing a received query on transient and persistent data.

FIG. 1 is a process flow diagram illustrating a method 100 in which, at 110, a query of a repository (e.g., meta-object facility, etc.) is received. Such a repository comprises transient data being modified or processed in memory and persisted data. Thereafter, at 120, portions of the received query are executed on partitions associated with the persisted data and other portions of the received query are executed on partitions of the repository associated with the transient data to generate a query result set.

Figure 2:
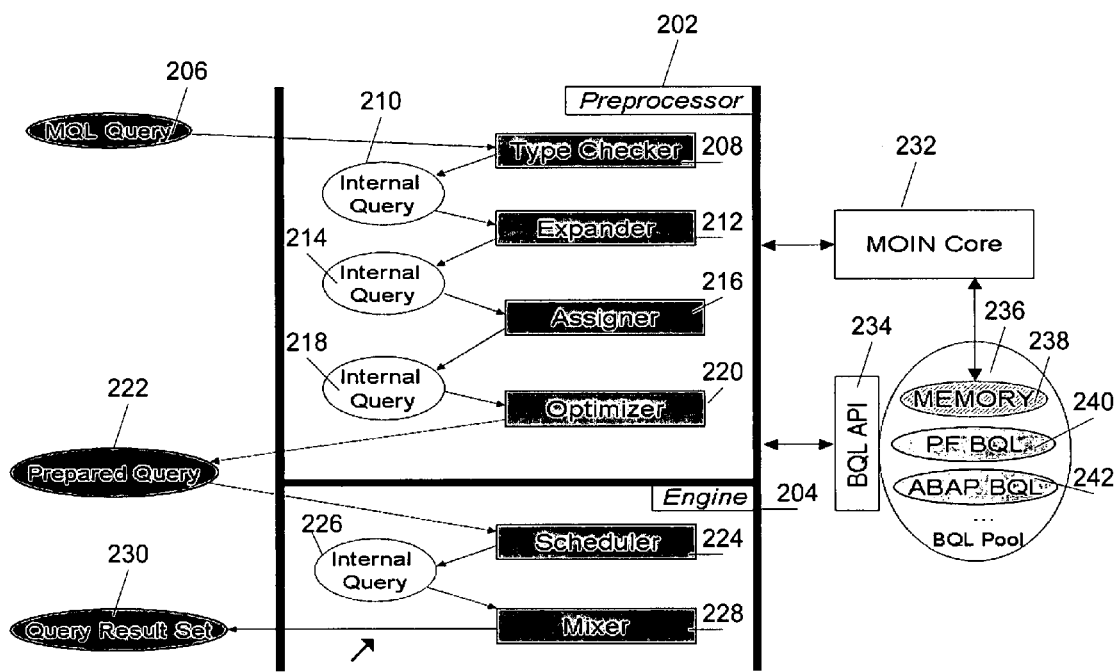
FIG. 2 is a diagram of a query processor with a pre-processor and an engine for handling and executing queries.

FIG. 2 is a diagram 200 illustrating an MQL processor 201 with a pre-processor 202 and an engine 204. Each MQL processor instance 201 expects a pool of basic query language (BQL) processors 236. This BQL pool 210 is fixed at MOIN instantiation time and depends on which facilities are bound to the MOIN instance. The MQL processor 201 always expects the BQL pool 210 to have a memory 238 implementation of the BQL API 234, which executes BQL queries 240, 242 directly in the MOIN core 232 for the loaded partitions of the client scope. The other bound BQL processors are specialized with respect to the facility type. However, all implement the BQL API 234. The standard provided facility for MOIN is the Primary Facility or PF BQL 240 (also referred to simply as "PF"), which also provides persistence and an implemented BQL.

The preprocessor 202 is responsible to turn a client-specified MQL Query 206 into a prepared query. The preprocessor maintains 4 phases:

1. Type checker 208: The type checker phase 208 checks if the MQL query 206 is type correct with respect to the MOF meta-model it operates on. Along the way, it translates the query into a first internal query 210 having an internal query structure.
2. Expander 214: In the expander phase 214, the first internal query 210 is expanded into a second internal query 214 such that it consists of query parts (leafs) which can be executed in one run on all registered BQL processors defined by the BQL pool 236. The remaining (non-leaf) parts are then interpreted by the MQL engine 204. In many ways, the expander performs macro-expansion to circumvent BQL restrictions.
3. Assigner 216: In the assigner phase 216, the corresponding registered BQL processor is assigned to each leaf query part and may transform the query to deal with multiple facilities to generate a third internal query 218.
4. Optimizer 218: In the optimizer phase 218, both facility-independent as well as facility-dependent optimizations can take place in connection with the generation of a prepared query 222. This phase may talk to a capability API of the assigned BQL for each involved leaf query and may further simplify the query.

The result of the preprocessor 202 is the prepared query 222, which is returned to the client. The preprocessor 202 only needs to know what BQL processors are registered in the pool 236 and is connection-state independent (i.e., it does not need to know whether the connection has dirty partitions or not). However, the preprocessor 202 does use the connection to access the meta-model data to do the type-checking and transformation in the internal query structure.

The engine 204 is responsible to execute the prepared query 222 on top of the registered BQL processors 236. It maintains two phases. The scheduler 224 of the engine 204 checks if there is dirty state (i.e., some partitions are dirty) and transforms a fourth internal query 226 such that the memory-only results are properly mixed by a mixer 228 with the persistent data. After scheduling, the mixer 228 interprets and executes the fourth internal query 226 by executing the leaf queries on their responsible BQL processor and, if necessary, by combining the results in-memory to eventually produce the desired query result set 230.

Figure 3:
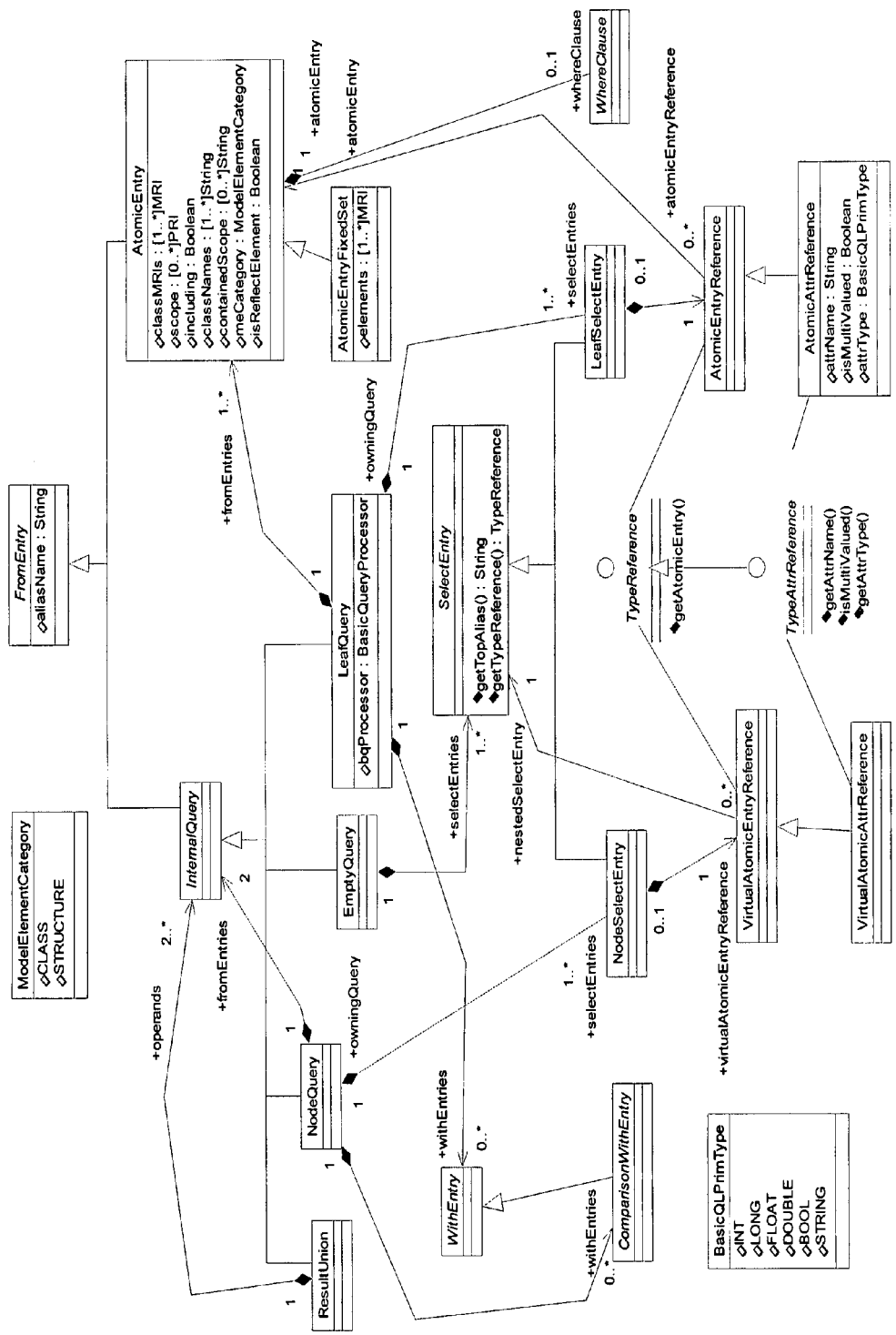
FIG. 3 is a class diagram illustrating main IQAS classes.
Figure 4:
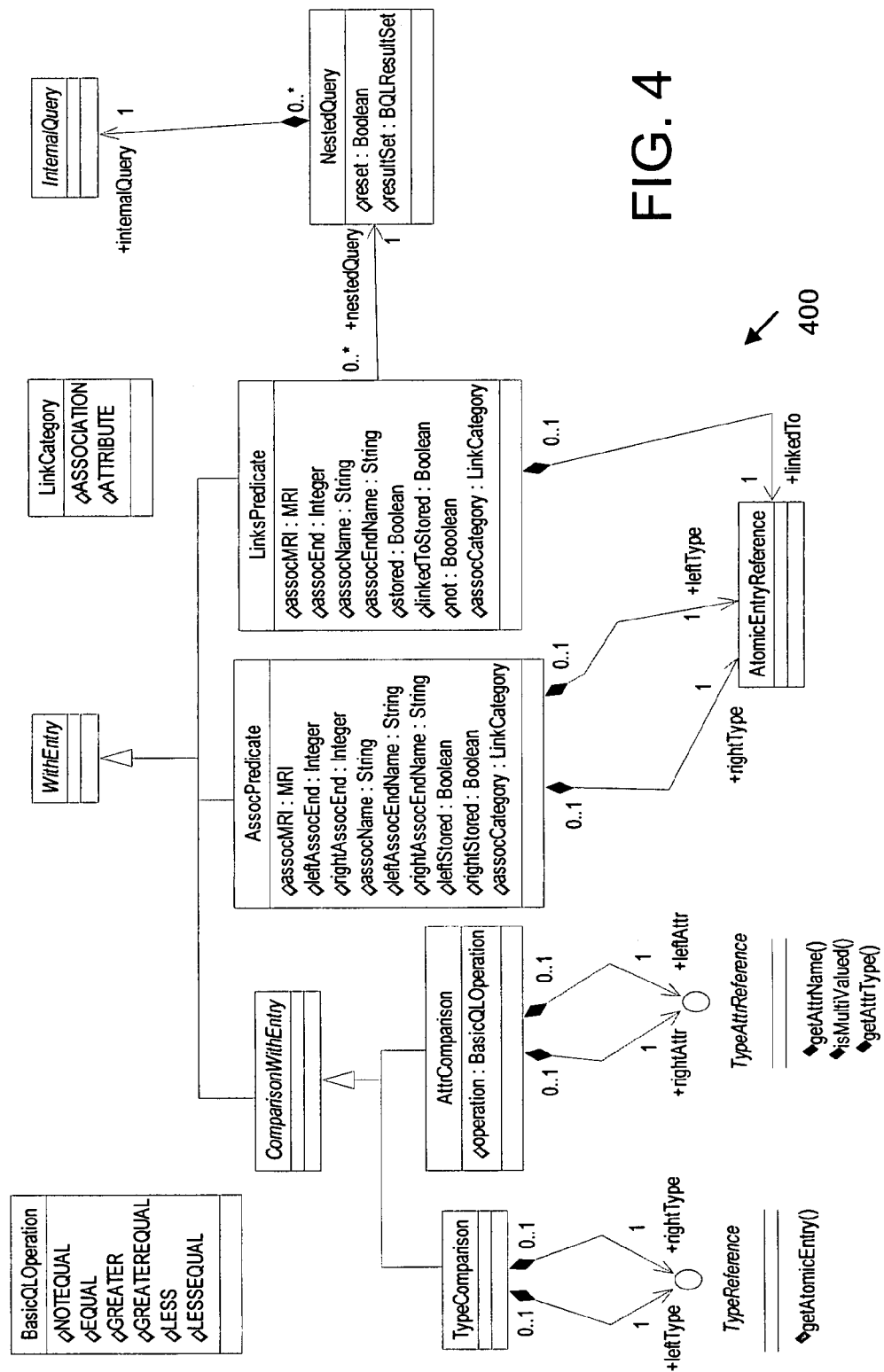
FIG. 4 is a class diagram illustrating "with" clause.
Figure 5:
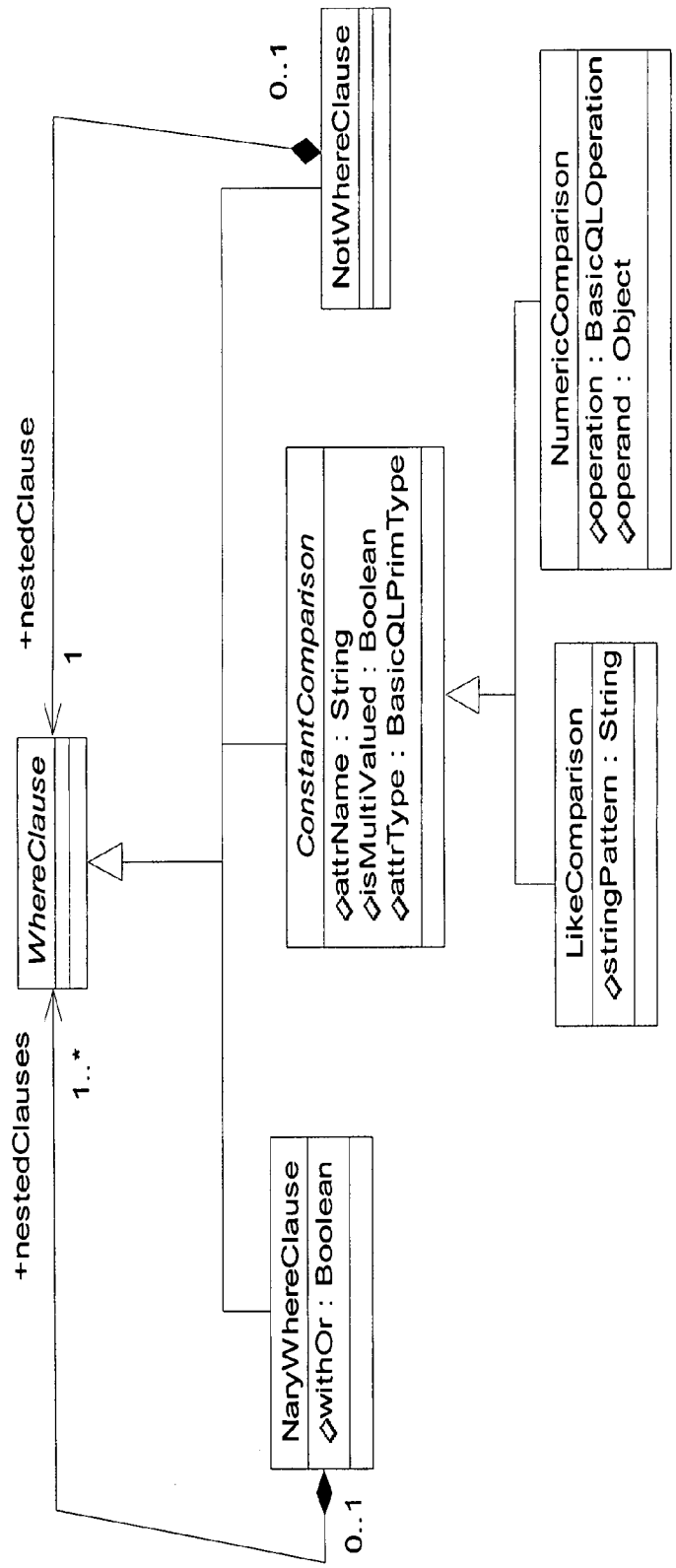
FIG. 5 is a class diagram illustrating "where" clause.

The execution logic within the MQL processor 201 (both the MQL preprocessor 202 and MQL engine 204) can be based on the Internal Query Abstract Syntax (IQAS for short). An MQL prepared query 222, which a client obtains after preparation, is an instance of this data structure. The class diagrams 300, 400, 500, respectively in FIGS. 3-5 describe and illustrate the IQAS structure. FIG. 3 illustrates the main IQAS classes. FIG. 4 illustrates the IQAS "with" clause. FIG. 5 illustrates the IQAS "where" clause.

The type checker 208 of the preprocessor 202 performs all required type and format checks on the input MQL query 206 as it is provided by a MOIN client. During this process, the type checker 208 translates a query formulated in the MQL API into the IQAS structure to generate the first internal query 210. The name-based references in the IQAS are only there for debugging purposes. The resulting IQAS is a true abstract syntax, i.e. everything is pointer-connected and there are no references-by-name left.

The expander 212 takes a consistent IQAS query (resulting from the type checker) (i.e., the first internal query 210) and translates it into a new IQAS query 214 (i.e., the second internal query 214), which guarantees that the participating leaf queries are executable by a complete BQL processor. A leaf query is an internal query which has no other internal queries in its from-clause.

The expander 212, can, for example, perform two transformations:

1. Splitting: Each leaf query can only be a true cluster (i.e., a query where all from-entries are connected to each other). The splitter moves any attribute or alias comparisons which cross two clusters to a higher level and constructs one leaf query for one cluster.
2. Removing unnecessary alias comparisons: Because BQL does not support alias comparisons (they are semantically not necessary within one cluster), this phase removes alias comparisons within one cluster. Alias comparisons that cross clusters are moved upwards by the splitter.

The first expanding transformation can be illustrated using the following sample MQL query:

```
(select a, a.n, b, b.m, c.n
    from A as a, B as b, C as c, D as d, E as e
    where a.p = b.m
    where b.end12[assoc1] = c
    where a.end22[assoc2] = d
    where d.t > e.f
    where a.end3[assoc3] in (select ...)
    where d.end4[assoc4] in (select ...)
    where e.end5[assoc5] in (select ...)
    where a.p > 5
    where e.f < 5
    where c.h = "test"
    where d.k = 0 and d.s = true
    where b.m != 3) as result
```

The BasicQL API 234 expects clusters of strongly connected AssocPredicates and LinksPredicates. MQL queries

206, which can have more than one such strongly connected cluster, need to be split as attribute and alias comparisons because cross cluster boundaries may still exist. Those boundaries have to be correctly spread over the clusters in such a way that they are calculated in-memory by the MQL engine 204.

The above example can be split as follows:

```
select q3.q2.a, q3.q2.a.n, q3.q1.b, q3.q1.b.m, q3.q1.c.n
from (select q2.a, q2.a.n, q1.b, q1.b.m, q1.c.n, q2.d.t
    from (select b, b.m, c.n
        from B as b, C as c
        where b.end12[assoc1] = c
        where b.m != 3) as q1,
        (select a, a.n, a.p, d.t
        from A as a, D as d
        where a.end22[assoc2] = d
        where a.end3[assoc3] in (select ...)
        where d.end4[assoc4] in (select ...)
        where a.p > 5
        where d.k = 0 and d.s = true) as q2
    where q2.a.p = q1.b.m) as q3,
    (select e.f
    from E as e
    where e.end5[assoc5] in (select ...)
    where e.f < 5) as q4
where q3.q2.d.t > q4.e.f
```

The two AssocPredicates and the LinkPredicate starting from alias e form three clusters represented by the leaf queries q1, q2, and q4. The selections in these queries obtain the selections for the final result as well as the selections required to perform the attribute and alias comparisons, which cross cluster boundaries. The clusters are grouped in pairs to avoid too large temporary results sets in memory. Moreover, in some implementations, leaf queries may be grouped which have (more) cross-cluster attribute comparisons because this also reduces intermediate result sets as much as possible. For example, for the above query, it would not be as effective to group q4 with q2 or q1.

With MQL, a client has to be ability to control whether a query is split in multiple smaller queries, which are then combined in memory. This is achieved with alias comparisons. They allow a client to break up a cluster. For instance, the query

```
(select a.t, b.m, c.n
    from A as a, B as b, B as b__, C as c
    where a.end12[assoc1] = b
    where b__.end22[assoc2] = c
    where b = b__) as result
``` is broken by the splitter in two smaller queries, each working on a BQL processor and joined by the MQL processor in memory.

In general, a client may have introduced alias comparisons which do not break up a cluster and which are therefore semantically unnecessary. For example, the query

```
(select a.t, b.m, c.n
    from A as a, B as b, B as b__, C as c
    where a.end12[assoc1] = b
    where b__.end22[assco2] = c
    where a.end32[assoc3] = c
    where b = b__) as result
``` does not actually break the cluster. Thus, a query which unifies aliases b and b_ will return the same results.

The removing of unnecessary alias comparisons detects these situations and unifies the aliases of superfluous alias comparisons. It does this by computing the intersection of the two aliases both in terms of their subtypes as well as their scope.

MOIN allows multiple facilities to be connected. It is the assigner's responsibility to execute the query over all registered facilities whenever it makes sense. Each leaf query resulting from the expansion is required to have exactly one BQL processor assigned. Some implementations of MOIN do not support cross-facility links and so the only technique to join results is via attribute comparisons. Such an invariant can be addressed in the logic of the assigner 216.

Generally, it is not guaranteed that each leaf query (as a result of the expander) has to be executed in exactly one facility. For instance, if no explicit scoping exists anywhere in the query, each leaf query has to be split over all facilities and the results have to be combined.

However, if an explicit (inclusion) scope is provided, it is possible that a leaf query does not have to be split, or only has to be split over the facilities which explicitly occur in the PRI (i.e. partition) list of the explicit scope. Generally, this process works best bottom-up because it is possible that link predicates can share nested queries (i.e., the result of the nested query can be reused). Moreover, if the user has provided incompatible scoping (i.e., the scope of the types caused a link or Assoc Predicate to cross facilities), the query may have no valid solutions. In that case, an empty result set can be pre-computed.

As an example, there are two registered BQL processors: PF 240 and ABAP 242 (which can provides data from the ABAP dictionary).

```
(select a, b
    from A as a, B as b
    where a.end12[myAssoc1] = b
    where a.end22[myAssoc2] in
        (select c
        from c as C, d as D in {p1}
        where c.end32[myAssoc3] = d)) as result
```

Assume that p1 lives in the facility PF 240. Then the assigner 216 produces the following query:

```
(select[PF] a, b
    from A as a, B as b
    where a.end12[myAssoc1] = b
    where a.end22[myAssoc2] in
        (select[PF] c
        from c as C, d as D in {p1}
        where c.end32[myAssoc3] = d)) as result
```

This assignment is made because the instances of D have to be taken from the PF facility 240 (via partition p1) and therefore also all linked instances in C, in A, and finally in B as well. If you have the following query however

```
(select q1.a, q2.c.m
    from (select a, a.n from A as a) as q1,
        (select c, c.m from C as c) as q2
    where q1.a.n = q2.c.m) as result
```

The assigner 216 translates it as follows:

```
(select q3.a, q4.c.m
    from    ((select[PF] a, a.n from A as a))
            union
            (select[ABAP] a, a.n from A as a))) as q3,
            ((select[PF] c, c.m from C as c))
            union
            (select[ABAP] c, c.m from C as c))) as q4
    where   q3.a.n = q4.c.m) as result
```

The union operation on internal queries works exclusively. Generally, all sorts of combinations are possible, although the assigner 216 only ever splits leaf queries into multiple queries, which it unifies after executing them on the participating facilities.

The optimizer 218 may perform optimizations or transformations that are beneficial for performance reasons. Such optimizations may be BQL processor dependent (since each leaf query is assigned a unique BQL processor now). In some variations, the optimizer 218 may talk to a capability API for each BQL processor and possibly further simplify each leaf query. With the example below, only queries that operate on an empty scope are removed.

Before doing the actual query execution, the scheduler 224 adapts the prepared query 222 to the current state of the repository (from the scope of one connection). Before doing so, the MQL engine registers 204 with any partition-change events as well as any type of change event to the dirty partition. If during execution, one such event is fired, the query result may be compromised and the client can be informed.

Before the actual scheduling logic starts (the scheduling logic is responsible for appropriately scheduling the query such that in-memory and persistent results are mixed in order to produce a correct result), a clone of the internally prepared query 222 may be made in order to guarantee that multiple executions of the same prepared query 222 do not affect each other. Moreover, explicit scopes in terms of container names are resolved and expanded in the actual partitions they entail at the moment of execution. The latter expansion cannot be accomplished during preparation time because partitions may still move from one container to the other before each query execution (but after query preparation).

Also, it is verified whether the regularly registered BQL processor happens to be the memory BQL 238. If that is the case, it is important that scheduling is not performed because the memory BQL 238 implementation always automatically obtains the correct results from dirty state. This deployment scenario is currently possible when dealing with builds (where no database cache is available).

The scheduler 224 acts to transform the internal query such that certain leaf queries are executed in the memory BQL processor 238 and others in the facility-specific BQL processor 240, 242. The results are combined in-memory. However, unlike the situation of the assigner 216, links may go from dirty partitions to persistent partitions and the other way around. Worse, dirty partitions override persistent data giving them precedence in their correctness with regard to their peer (and out-of-date) partitions which still reside persistently. This makes the algorithm for assigning the memory BQL processor 238 to leaf queries somewhat different than the assignment process.

Figure 6:
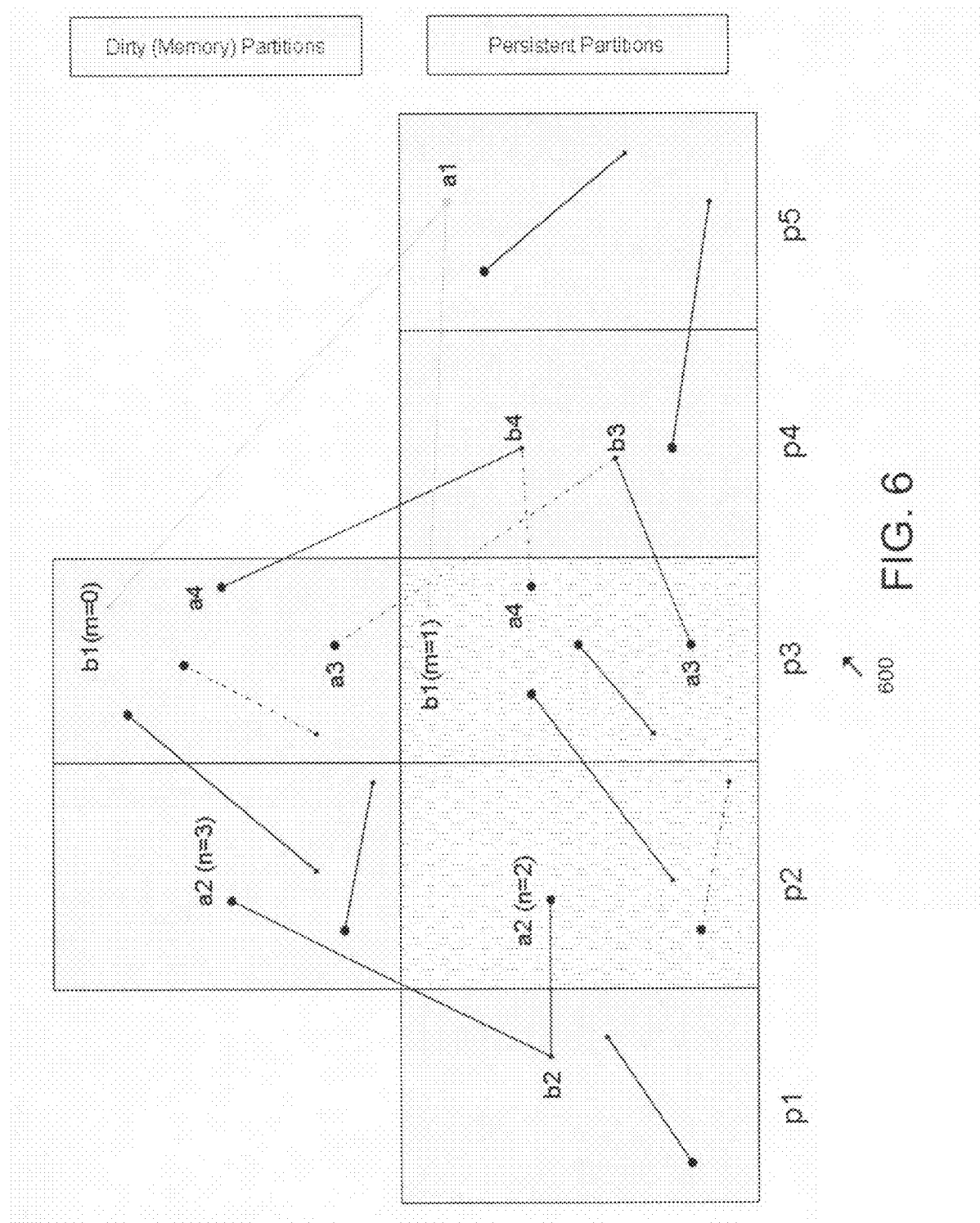
FIG. 6 is an example diagram illustrating data partitions in which certain partitions are dirty and others are persisted.

FIG. 6 is a diagram 600 illustrating a series of partitions p1-p5, in which certain partitions are dirty and others are persisted. The links from b2 to a2 and the link b4 to a4 are cross-dirty-partition links that have storage in the dirty partitions and the links a1 to b1 are cross-dirty-partition links that have no storage in the dirty partitions. The dashed links, (e.g., a4 to b4, b3 to a3, etc.) represent one of 1) an in-memory dashed link that once existed, but was subsequently deleted, or 2) a persistent dashed link that did not exist before, but was created. Moreover, it can be assumed that the type of aliases b* has an attribute m and the type of aliases a* has attribute n. Included are two example aliases with attribute values: b1 has attribute m with value 1 and a2 has attribute n with value 2 persistently. In the dirty partitions, these values changed to 0 and 3 respectively.

The simplest case is when there is one from-entry, which has no Assoc or Link predicates (because expansion has guaranteed us that clusters need to be dealt with). In that case, one can look at the scope of the one from-entry. If its scope is spread over dirty and non-dirty partitions, one has to unify the results from both sources, (i.e., in-memory from the dirty partitions and persistently over all partitions in scope, except the dirty partitions). If the scope comes exclusively from the dirty state, one only has to obtain the instances from the dirty partitions, and similarly if the scope comes exclusively from non-dirty state.

For instance, suppose the query before scheduling looks as follows:

```
(select[PF] a, a.attr1
    from A as a
    where a.n = 3) as result
```

Next, the scheduling process produces:

```
((select[PF] a, a.attr1
    from A as a not in {p2, p3}
    where a.n = 3)
union
    (select[MEMORY] a, a.attr1
    from A as a in {p2, p3}
    where a.n = 3) as result
```

Certain issues must be taken into account when scheduling is required to take into account links. As an example a simple sale query which is to operate on the state as depicted in FIG. 6 is assumed to have the PF BQL processor 240 working on persistent state. With such an arrangement, the query before scheduling can look as follows:

```
(select[PF] a, a.attr1, b, b.attr2
    from A as a, B as b
    where a.end2[myAssoc] = b
    where a.n > b.m
    where b.m > 0
    where a.n = 3) as result
```

It can be assumed that all shown links in FIG. 6 are instances of myAssoc, where it can be defined that storage for myAssoc is only on the side of A. This situation is depicted in FIG. 6 by the fact that only aliases a* (all of type A) have thicker ends (bullets).

The following transformed query obtains all the model elements above as one would expect from this state.

```
((select[PF] a, a.attr1, b, b.attr2
from A as a not in {p2, p3}, B as b not in {p2, p3}
where a.end2[myAssoc] = b
where a.n > b.m
where b.m > 0
where a.n = 3)
union
(select[MEMORY] a, a.attr1, b, b.attr2
from A as a in {p2, p3}, B as b in {p2, p3}
where a.end2[myAssoc] = b
where a.n > b.m
where b.m > 0
where a.n = 3)
union
(select[MEMORY] a, a.attr1, b, b.attr2
from A as a in {p2, p23}, B as b in {p1, p4}
where a.end2[myAssoc] = b
where a.n > b.m
where b.m > 0
where a.n = 3)
union
(select q1.a, q1.a.attr1, q2.b, q2.b.attr2
from (select[PF] a, a.attr1, a.n, b__
      from A as a not in {p2, p3}, B as b__ in {p2, p3}
      where a.end2[myAssoc] = b__
      where a.n = 3) as q1,
     (select[MEMORY] b, b.attr2, b.m
      from B as b in {p2, p3}
      where b.m > 0) as q2
where q1.b__ = q2.b)
where q1.a.n > q2.b.m) as result
```

The above query unifies four separate result sets. The first query runs on all persistent partitions, except those which are labeled dirty (i.e., p2 and p3). The second query runs on all partitions, which are in dirty memory only. These two queries produce all the results, which are connected via black links in FIG. 6 (i.e., links between model elements that are either both in dirty partitions or both in persistent partitions).

The two remaining (top-level) queries find results which are connected via cross-dirty-partitions links. For type A, this means a1, a2, and a4. For type B, this means b1, b2, and b4. The exact form of these two queries depends on storage ownership properties of the association. Because storage is on the side of A, in this example, one can find all the results connected via the gray links in FIG. 6 (i.e., b1-a1 links) by computing the third query above, which looks for all links, which have the end of A in one of the dirty partitions and the end of B in a non-dirty partition. In order to calculate this, the memory BQL processor 238 may load the partitions in which the instances of B exist via this link. In the example, these are the partitions p1 and p4, but not p5. These partitions (together with the dirty partitions p2 and p3) can be calculated by investigating all links located in the dirty partitions and collecting all partitions used by those links. In some implementations, not many partitions will be affected by this arrangement because of a locality-principle when querying data, connected model elements where there is storage for the association.

Finally, in order to find the model elements connected via a cross-dirty-partition link (e.g., a1 to b1) (i.e., where storage ownership is in a partition, which is not dirty, and therefore, not necessarily loaded), the fourth query can be fired. This query is complex because it cannot include information from a persistent partition, which has changed in memory. In other words, a super-set of all relevant links is searched persistently because any conditions on the side of B may be outdated. The elements are filtered with the dirty state where the condition on the side of B are up to date. Such a query can be characterized as: the instances of B that fulfill the condition from the dirty partitions are joined with the instances found via links in the persistence layer.

The above can be simplified by combining the second and the third query, leading to the following result query:

```
((select[PF] a, a.attr1, b, b.attr2
from A as a not in {p2, p3}, B as b not in {p2, p3}
where a.end2[myAssoc] = b
where a.n > b.m
where b.m > 0
where a.n = 3)
union
(select[MEMORY] a, a.attr1, b, b.attr2
from A as a in {p2, p3}, B as b in {p1, p2, p3, p4}
where a.end2[myAssoc] = b
where a.n > b.m
where b.m > 0
where a.n = 3)
union
(select q1.a, q1.a.attr1, q2.b, q2.b.attr2
from (select[PF] a, a.attr1, b__
      from A as a not in {p2, p3}, B as b__ in {p2, p3}
      where a.end2[myAssoc] = b
      where a.n = 3) as q1,
     (select[MEMORY] b, b.attr2
      from B as b in {p2, p3}
      where b.m > 0) as q2
where q1.b__ = q2.b
where q1.a.n > q2.b.m)) as result
```

Such an algorithm can be characterized as a spreading algorithm, because it spreads the query over the memory and persistent facilities in such a way that it produces correct results.

A small but important optimization is possible whenever there are no additional constraints or information requests on the side of B. This entails:

No attribute selection on B exists in the select clause

There exists no where clause for B

There exists no attribute comparison which involves attributes of B

B is not involved in a links predicate

When these conditions apply, B's alias can be characterized as simple.

Consider the slightly adapted sample query:

```
(select[PF] a, a.attr1, b
from A as a, B as b
where a.end2[myAssoc] = b
where a.n = 3) as result
```

Because b is simple, material does not need to be fetched from the dirty partitions and as a result, two queries can be collapsed on the PF facility 240. The resulting query looks like this:

```
((select[PF] a, a.attr1, b
from A as a not in {p2, p3}, B as b
where a.end2[myAssoc] = b
where a.n = 3)
union
(select[MEMORY] a, a.attr1, b
from A as a in {p2, p3}, B as b in {p1, p2, p3, p4}
where a.end2[myAssoc] = b
where a.n = 3)) as result
```

Explicit scoping by MQL clients may empty one of the participating queries even before it is executed. This allows for significant simplifications such that the result can be identical to the original query (i.e., before scheduling). This arrangement can be exploited in the generalized scheduling algorithm described below. However, because of the significant effect explicit scoping has on the effectiveness of the scheduler techniques for optimization can be implemented.

This optimization can be based on the fact that dirty partitions are always client-specific and loaded. This makes it relatively cheap to process the content of these partitions. Based on this knowledge, the scoping of each alias in a leaf query can be reduced by checking if there are any instances for its type in any of the dirty partitions. If not, these partitions can be automatically excluded from the alias's scope, even if the client did not provide explicit scoping. In particular, if a query is to be executed which has no relation to the elements in dirty state, it can still be executed as optimal as if there was no dirty state.

Finally, note that the query spreading algorithm is only driven by the fact that storage is on the side of A, but not on the side of B for association myAssoc. If both ends of the association have storage, one can choose what side of the association is use to split the calculations along the dirty partition boundaries. This leads to the concept of a dominant and a sub-dominant assigned alias with respect to an association. In the above example, alias a is dominantly assigned with respect to myAssoc and alias b is sub-dominantly assigned with respect to myAssoc. By definition, an alias can only be assigned the dominant property with respect to an association if that association has storage on the side of the alias. However, an alias can be assigned sub-dominantly with respect to an association even if the association has storage on that side.

Links may also be queried via link predicates. Link predicates are not affected in the same way by the spreading algorithm because it is possible to compute the nested query first and put its result set in the link predicate. This ability can be exploited as soon as a nested query is subject to any kind of mixing (i.e., results have to be combined in memory).

The only situation in which the nested query is incorporated in the encompassing query (which holds the link predicate) is whenever:

1. The nested query is processed entirely (up to its own link predicates) in one BQL processor; and
2. The (possibly non-leaf) query holding the link predicate can be processed in the same BQL processor.

Whether or not a nested query is computed separately is indicated with the reset attribute in the NestedQuery class of IQAS. During mixing, this attribute is used to decide whether the results of the nested query should be cached or not.

In many aspects, dealing with link predicates is similar to the case where there are no link or assoc predicates at all. For instance, consider the following simple example, where it is assumed that the instances of B are taken from p4 to make sure that no scheduling was required for the nested query:

```
(select[PF] a, a.attr1
from A as a
where a.end2[myAssoc] in
    (select[PF] b
    from B as b in {p4}
    where b.m = 0)
where a.n = 3) as result
```

This can be translated as follows:

```
((select[PF] a, a.attr1
from A as a not in {p2, p3}
where a.end2[myAssoc] in
    (select[PF] b
    from B as b in {p4}
    where b.m = 0) as q
where a.n = 3)
union
(select[MEMORY] a, a.attr1
from A as a in {p2, p3}
where a.end2[myAssoc] in
    (select[PF] b
    from B as b in {p4}
    where b.m = 0) as q
where a.n = 3)) as result
```

With such a result, query q is internally shared (i.e., the original nested query was reset before the spreader started).

In some instances, scheduling with dirty partitions must be conducted for a query which is a non-trivial cluster containing more than one assoc or link predicate. In such cases, it can be assumed that with each jump persistent and transient results may be required to be mixed. The spreading algorithm described above works for two aliases with one association. When a leaf query has more than one assoc predicate, the problem can be reduced to the case for one assoc predicate so that the results can be combined.

One way to reduce the general problem to the smaller problem is to break the entire cluster apart in many small clusters of one assoc and link predicate. This is possible by cloning all shared aliases and introducing alias comparisons which are resolved by the MQL mixer 228 in memory. This method multiplies the number of required queries by the number of assoc predicates. Although in the general case, this negative behavior cannot be avoided, it does not incorporate the explicit scoping annotations of the client. Because a client is encouraged to give explicit scoping, there may be situations in which a less conservative query break-up can be achieved. As an example, in cases in which it can be initially detected whether a type has instances in a dirty partition in the first place, a less conservative break-up mechanism can be utilized.

As described above, client-specific scoping may simplify the result of spreading considerably. In some cases, in fact, the spreader will again produce one query, not a union of multiple queries. Whenever that is the case for an assoc predicate, one can easily deal with another assoc predicate because the spreader only has to add additional constraints in this query.

In order to define an (heuristically) optimizing algorithm to combine assoc predicates, the kind of assoc predicates that lead to one query after spreading need to be determined. In order to do this, an annotated graph of a leaf query can be constructed, where each node is an alias and each edge is an assoc predicate on two aliases (storage properties are also put on the edges). Moreover, with reference to the graph 700 of FIG. 7, nodes can be categorized in three classes:

1. Non-dirty nodes 700*a*, 700*b*, 700*c*, meaning that the explicit provided scope does not include dirty partitions.
2. Memory-only nodes 700*d*, 700*f,* meaning that the explicit provided scope does only include dirty partitions
3. Mixed nodes 700*e*, meaning that the explicit or implicit scope includes both dirty and non-dirty partitions.

Finally, it can also be indicated whether an alias is simple according to the conditions listed earlier.

Figure 7:
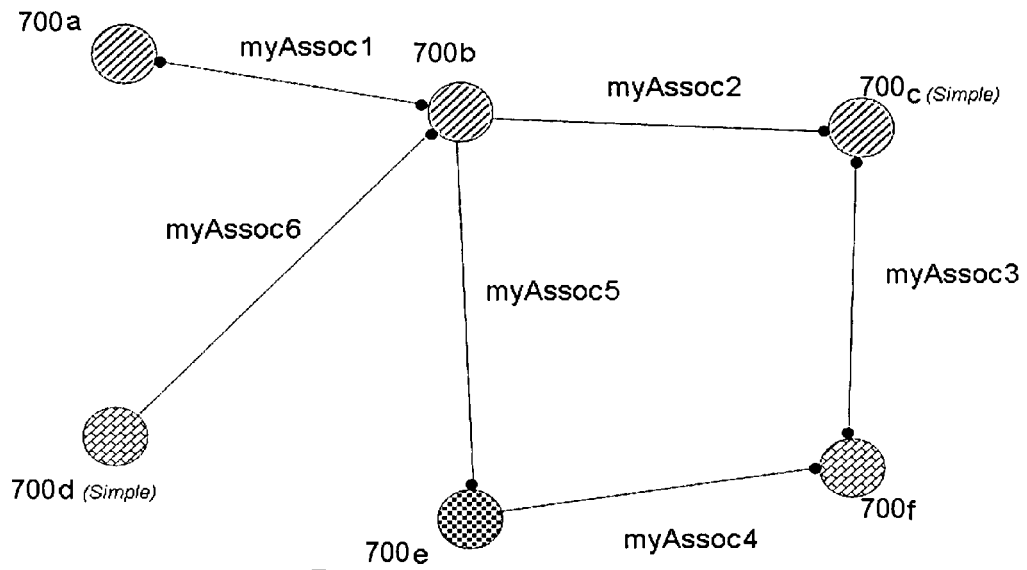
FIG. 7 is an example initial graph abstraction of an MQL query.

With continued reference to FIG. 7, the illustrated graph 700 can be decomposed into spreadable sub-graphs such that the final combined result of spreading the sub-graphs produces a correct result. The criterion for making the spreader work for more than one assoc predicate is dependent on whether the spreader would have to introduce more than one (unified) query. If more than one query has to be produced, the spreader has to consider all possible combinations of assoc predicates, which makes the eventual results not more attractive than simply breaking up the above graph in pairs. However, when only one query is required to combine more than one assoc predicate, these predicates can be combined in a larger query than just a pair of aliases.

To examine this criterion, it must be determined how spreading behaves whenever explicit scoping has specialized the type of a node. Recall from above that in the non-simplified case, there may be a need to construct and unify three queries (the last one actually consists of two queries), whereas in the simplified case, there is only a need to construct and unify two queries. In the case of non-simplified spreading, each query can be named in its order of appearance Q1 through Q3. Whenever simplified spreading can be applied, an adapted form of query Q1 (let us call it Q1') and query Q2 can be utilized. The table 800 of FIG. 8 lists out queries to use for spreading assoc predicates with different classes of atomic entries.

As listed in table 800, there can be nine cases to consider. The first three cases are easily addressed. Either an assoc predicate connects two aliases that are entirely in the dirty space, entirely in the non-dirty space, or entirely in a mixed space. The third case is the worst-case scenario whereas the first and second cases are optimal.

The remaining six cases in table 800 are mixed scenarios where there are dominant and sub-dominant sides (the possibility of this choice of course depends on storage ownership of the association). It is noted that cases six and eight have the memory-only nodes as being dominant, which allows them to be solved by query Q2 only. Cases four and five are similar in that they have non-dirty nodes that are dominant, however, it can be expected that the sub-dominant aliases for the association are simpler (i.e. not attribute selection or where-condition).

In some implementations, it can be beneficial to combine as much memory-only nodes and non-dirty nodes. In the former case, one can hang on an isolated node of a different texture (as illustrated in FIG. 7), provided storage is on the side of the memory-only node. In the latter, hanging on nodes of a different texture (as illustrated in FIG. 7) can be implemented provided these nodes are simple (and again, storage is on the side of the non-dirty node). In all other cases, the graph 700 can be decomposed into pair-graphs.

Based on the above data, the following algorithm can be utilized to produce enhanced results:

1. Search for the "largest" (i.e. the largest number of edges) possible sub-graph with at least one edge, constructed in one of the following two ways:
   a. The graph is a strongly connected sub-graph of memory-only nodes with possibly other-colored nodes hanging on to it where storage is on the side of the memory-only node; or
   b. The graph is a strongly connected sub-graph of non-dirty nodes with possibly other-colored nodes hanging on to it which are simple and where storage is on the side of the non-dirty node
2. Whenever there was a choice, prefer the second type and "isolate" it from the original graph (by cloning and introducing alias comparisons);
3. Go back to step 1 until no graph like that can be constructed. In that case, it can be established that the remaining graph only has mixed nodes and possibly memory-only and non-dirty nodes for which no storage exists on their sides.
4. For those remaining graphs, perform a complete break-up, and therefore produce sub-graphs which are pairs and directly amenable to spreading.

Along the way, the algorithm records for the special graphs introduced in step 1 with what type of query they have to be solved as well as the required scoping restrictions for each of the nodes. Similar recording can be conducted for the pair-wise graphs, constructed in step 4.

Figure 9:
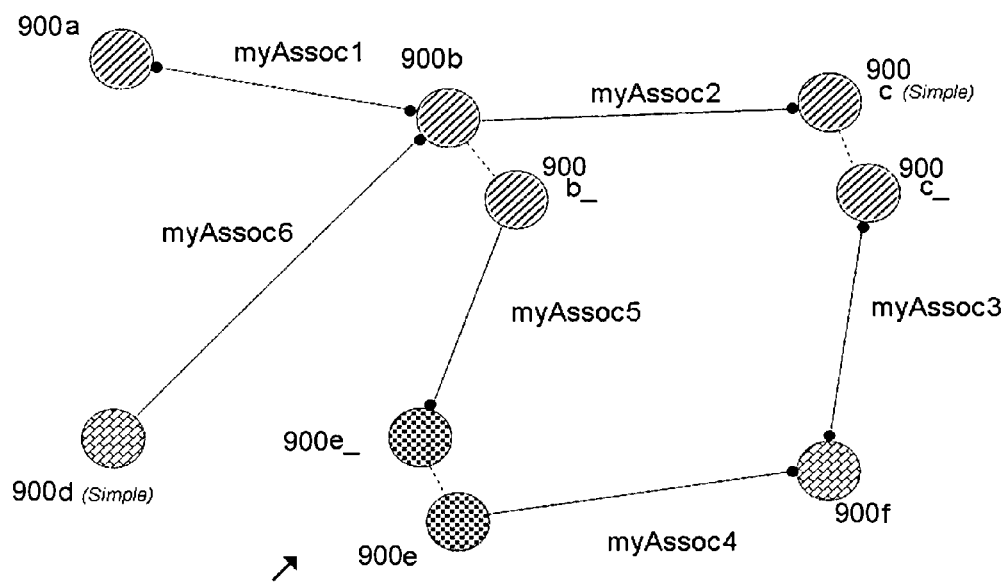
FIG. 9 is an example processed graph abstraction of an MQL query.

After breaking up the initial leaf query graph, the splitter from the expander 212 can be applied and then, for each leaf query, apply the spreading algorithm with the information recorded above. FIG. 9 is a graph 900 of an illustrative break up of the graph 700 in FIG. 7. Notice that atomic entry 900d is "simple" and thus can be included in the strongly connected graph of non-dirty aliases. The result of this breaking up is that the group with myAssoc1, myAssoc2, and myAssoc6 can be calculated in Q1 (and Q1'), the group with myAssoc3 and myAssoc4 in Q2, and the group with myAssoc5 in Q1 and Q2.

As an example query, which corresponds to graph 700 of FIG. 7 and graph 800 of FIG. 8, the following query can be implemented before scheduling:

```
(select[PF] a, b, c, d, e, f.attr
    from A as a in {p4, p5},
        B as b in {p1},
        C as c in {p6, p7},
        D as d in {p2},
        E as e,
        F as f in {p2, p3}
    where a.end12[myAssoc1] = b
    where b.end22[myAssoc2] = c
    where c.end32[myAssoc3] = f
    where f.end42[myAssoc4] = e
    where e.end52[myAssoc5] = b
    where b.end61[myAssoc6] = d) as result
```

Assuming that p2 and p3 are dirty, breaking up the leaf query graph produces:

```
(select[PF] a, b, c, d, e, f.attr
    from A as a in {p4, p5}
        B as b in {p1},
        B as b__ in {p1},
        C as c in {p6, p7},
        C as c__ in {p6, p7},
        D as d in {p2},
        E as e,
        E as e__,
        F as f in {p2, p3}
    where a.end12[myAssoc1] = b
    where b.end22[myAssoc2] = c
    where c__.end32[myAssoc3] = f
    where f.end42[myAssoc4] = e
    where e__.end52[myAssoc5] = b__
    where b.end62[myAssoc6] = d
    where b = b__
    where c = c__
    where e = e__) as result
```

The next step for the scheduler 224 is to split up the above query as occurs with the expander 212:

```
(select iq3.iq1.a, iq3.iq1.b, iq3.iq1.c,
    iq3.iq1.d, iq3.iq2.e, iq3.iq2.f.attr
 from (select iq1.a, iq1.b, iq1.c, iq1.d, iq2.e, iq2.f.attr
      from (select[PF] a, b, c, d
           from A as a in {p4, p5}
               B as b in {p1},
               C as c in {p6, p7},
               D as d in {p2}
           where a.end12[myASsoc1] = b
           where b.end22[myAssoc2] = c
           where b.end62[myAssoc6] = d) as iq1,
           (select[PF] c_, f, f.attr, e
           from C as c_ in {p6, p7},
               E as e,
               F as f in {p2, p3}
           where c_.end32[myAssoc3] = f
           where f.end42[myAssoc4] = e) as iq2
      where iq1.c = iq2.c_) as iq3,
      (select[PF] b_, e_
      from B as b_ in {p1},
          E as e_
      where e_.end52[myAssoc5] = b_) as iq4
 where iq3.iq1.b = iq4.b_
 where iq3.iq2.e = iq4.e_) as result
```

Thereafter, spreading can be applied (using the calculated annotations). As an example, the following assumptions can be made:

The association dependent partitions for alias c_ from alias f via assoc myAssoc3 are p6 and p5

The association dependent partitions for alias e from alias f via myAssoc4 are p3 and p4

The association dependent partitions for alias b_ from alias e_ via myAssoc5 are p1, p2, and p5

The result looks as follows:

```
(select iq3.iq1.a, iq3.iq1.b, iq3.iq1.c,
    iq3.iq1.d, iq3.iq2.e, iq3.iq2.f.attr
 from (select iq1.a, iq1.b, iq1.c, iq1.d, iq2.e, iq2.f, iq2.f.attr
      from (select[PF] a, b, c, d
           from A as a in {p4, p5}
               B as b in {p1},
               C as c in {p6, p7},
               D as d in {p2}
           where a.end12[myAssoc1] = b
           where b.end22[myAssoc2] = c
           where b.end62[myAssoc6] = d) as iq1
           (select[MEMORY] c_, f, f.attr, e
           from C as c_ in {p6},
               E as e in {p3, p4},
               F as f in {p2, p3}
           where c_.end32[myAssoc3] = f
           where f.end42[myAssoc4] = e) as iq2
      where iq1.c = iq2.c_) as iq3,
      ((select[PF] b_, e_
      from B as b_ in {p1},
          E as e_ not in {p2, p3}
      where e_.end52[myAssoc5] = b_)
      union
      (select[MEMORY] b_, e_
      from B as b_ in (p1, p2, p5},
          E as e_ in {p2, p3}
      where e_.end52[myAssoc5] = b_)) as iq4
 where iq3.iq1.b = iq4.b_
 where iq3.iq2.e = iq4.e_) as result
```

It can be observed that query iq1 is untouched. In query iq2 f is dominant and thus the dependent partitions can be incorporated in the scopes of c_ and f. Similarly, in query iq4, the dependent partitions can be incorporated in the scope of alias b_in the memory-based query because e_ is dominant.

When dealing with nested queries introduced by link predicates, it can be assumed that a nested query has to be reset, which means that the nested query is first calculated and the results are stored as intermediate result, which is then fed in the actual encompassing link predicate. However, there is one type of situation in which it may be desirable to keep the nested query together with the encompassing query and pass it on to the responsible BQL processor in one go. This situation occurs when both the nested query and the encompassing query are not spread over multiple queries and are executed on the same BQL processor. It may also be possible to not reset a nested query when the encompassing query is broken up over multiple queries. However, because in that case the nested query is reused in more than one place, it is reasonable to compute the intermediate result nonetheless. The decision to not reset a nested query can only be made after both the nested query and the encompassing query have been analyzed for break-up.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages including the ability to efficiently provide responses to queries of both transient and persistent data so that new or modified model data can form part of the query result set. Additionally, typical tools based on MOIN maintain implicit constraints during the editing process. Such constraints typically ensure a certain form of consistency with existing repository data. The scheduling logic described herein allows for the verification of such constraints with a declarative query before edited data is even saved while avoiding memory consumption levels associated with non-query language based methods (such as JMI).

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a machine-readable storage medium tangibly embodying instructions that when performed by one or more machines result in operations comprising:
receiving a query of a meta-object facility repository, the repository comprising transient data being modified or processed in memory and persisted data;
determining, by a scheduler, which of a plurality of partitions of the repository are being edited, which partitions of the repository are loaded, and which partitions of the repository are only persisted, the determination being based on partition-change events and change events to dirty partitions that are registered by a query engine; and
transforming the query into first portions and second portions based on the determination by the scheduler;
executing the first portions of the transformed query on partitions associated with the persisted data and executing the second portions of the transformed query on partitions of the repository associated with the transient data to generate a query result set.

2. An article as in claim 1, wherein the executing further comprises:
determining whether the query is type correct with respect to a corresponding meta-object facility meta-model; and
transforming the query into a first internal query having an internal query structure.

3. An article as in claim 2, wherein the executing further comprises:
expanding the first internal query into a second internal query containing leaf queries which can be executed in a single run on all query processors registered with the meta-object facility repository and non-leaf portions which can be interpreted by the query engine.

4. An article as in claim 3, wherein the executing further comprises:
assigning each leaf query with the corresponding registered query processor to generate a third internal query.

5. An article as in claim 4, wherein the executing further comprises:
optimizing the third internal query to generate a prepared query.

6. An article as in claim 5, wherein the executing further comprises:
checking whether any of the partitions are dirty to generate fourth internal query mixing transient data and persistent data.

7. An article as in claim 6, wherein the executing further comprises:
executing the leaf queries of the received query on the corresponding registered query processors.

8. An article as in claim 7, wherein the executing further comprises:
combining results from the executed leaf queries of the received query with in-memory results to generate the query result set.

9. A computer-implemented method comprising:
receiving a query of a meta-object facility repository, the repository comprising transient data being modified or processed in memory and persisted data; and
executing a first set of portions of the received query on partitions associated with the persisted data, executing a second set of portions of the received query on partitions of the repository associated with the transient data, executing a third set of portions of the received query on partitions associated with the persisted data that are linked to partitions with the transient data, and executing a fourth set of portions of the received query on partitions associated with the transient data that are linked to partitions with persisted data to collectively generate a query result set, the first, second, third and fourth sets of portions being disjoint.

10. A method as in claim 9, wherein the executing further comprises:
determining whether the query is type correct with respect to a corresponding meta-object facility meta-model; and
transforming the query into a first internal query having an internal query structure.

11. A method as in claim 10, wherein the executing further comprises:
expanding the first internal query into a second internal query containing leaf queries which can be executed in a single run on all query processors registered with the meta-object facility repository and non-leaf portions which can be interpreted by an engine.

12. A method as in claim 11, wherein the executing further comprises:
assigning each leaf query with the corresponding registered query processor to generate a third internal query.

13. A method as in claim 12, wherein the executing further comprises:
optimizing the third internal query to generate a prepared query.

14. A method as in claim 13, wherein the executing further comprises:
checking whether any of the partitions are dirty to generate fourth internal query mixing transient data and persistent data.

15. A method as in claim 14, wherein the executing further comprises:
executing the leaf queries of the received query on the corresponding registered query processors.

16. A method as in claim 15, wherein the executing further comprises:
   combining results from the executed leaf queries of the received query with in-memory results to generate the query result set.

17. An apparatus comprising:
   a query pre-processor to receive a query of a meta-object facility repository, the repository comprising transient data being modified or processed in memory and persisted data; and
   a query engine to execute portions of the received query on partitions associated with the persisted data and to execute portions of the received query on partitions of the repository associated with the transient data to generate a query result set, at least a portion of the result set being generated from results connected via cross-dirty partition links.

18. An apparatus as in claim 17, wherein the pre-processor comprises:
   a type checker to determine whether the query is type correct with respect to a corresponding meta-object facility meta-model and to transform the query into a first internal query having an internal query structure;
   an expander to expand the first internal query into a second internal query containing leaf queries which can be executed in a single run on all query processors registered with the meta-object facility repository and non-leaf portions which can be interpreted by the engine;
   an assigner to assign each leaf query with the corresponding registered query processor to generate a third internal query; and
   an optimizer to optimize the third internal query to generate a prepared query.

19. An apparatus as in claim 18, wherein the engine comprises:
   a scheduler to check whether any of the partitions are dirty to generate fourth internal query mixing transient data and persistent data and to execute the leaf queries of the received query on the corresponding registered query processors; and
   a mixer to combine results from the executed leaf queries of the received query with in-memory results to generate the query result set.

20. An apparatus as in claim 19, wherein the query pre-processor identifies partitions of the repository in which data is being modified, partitions of the repository that are loaded in memory but are unchanged, and partitions of the repository which are persisted and not loaded in memory.

* * * * *